(12) United States Patent
Lyman et al.

(10) Patent No.: US 8,789,366 B2
(45) Date of Patent: Jul. 29, 2014

(54) SHAPE MEMORY STORED ENERGY ASSEMBLIES AND METHODS FOR USING THE SAME

(75) Inventors: Ward D. Lyman, Tucson, AZ (US); Frederick B. Koehler, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 303 days.

(21) Appl. No.: 13/155,575

(22) Filed: Jun. 8, 2011

(65) Prior Publication Data

US 2011/0232278 A1    Sep. 29, 2011

Related U.S. Application Data

(63) Continuation-in-part of application No. 12/332,004, filed on Dec. 10, 2008, now Pat. No. 8,418,455.

(51) Int. Cl.
*F01B 29/08* (2006.01)

(52) U.S. Cl.
USPC ............... 60/527; 60/528; 60/529; 244/3.22; 244/3.24; 244/3.1

(58) Field of Classification Search
USPC ................ 60/527, 528, 529; 310/306–307; 337/14–141, 296
See application file for complete search history.

(56) References Cited

U.S. PATENT DOCUMENTS

| | | | |
|---|---|---|---|
| 4,716,731 A | 1/1988 | Sakai et al. | |
| 4,839,479 A * | 6/1989 | Davis, Jr. | 200/61.45 R |
| 4,899,543 A | 2/1990 | Romanelli et al. | |
| 4,945,727 A | 8/1990 | Whitehead et al. | |
| 5,061,914 A | 10/1991 | Busch et al. | |
| 5,105,178 A | 4/1992 | Krumme | |
| 5,119,555 A * | 6/1992 | Johnson | 29/254 |
| 5,245,738 A | 9/1993 | Johnson | |

(Continued)

FOREIGN PATENT DOCUMENTS

| | | |
|---|---|---|
| JP | 04134227 A | 5/1992 |
| JP | 2006316830 | 11/2006 |
| WO | WO-2010068266 A1 | 6/2010 |

OTHER PUBLICATIONS

U.S. Appl. No. 12/332,004, Non Final Office Action mailed May 10, 2011, 8 pgs.

(Continued)

*Primary Examiner* — Kenneth Bomberg
*Assistant Examiner* — Shafiq Mian
(74) *Attorney, Agent, or Firm* — Schwegman, Lundberg & Woessner, P.A.

(57) ABSTRACT

A shape memory stored energy assembly includes a projectile housing having a projectile lumen. A projectile is within the projectile lumen and the projectile is movable relative to the projectile housing. A shape memory actuator is coupled between the projectile anchored end and the projectile housing. The shape memory actuator is configured to transition from a strained energy stored configuration to a fractured kinetic delivery configuration at a specified temperature range to propel the projectile through the projectile lumen. A method includes storing energy in a shape memory actuator coupled with a projectile. The stored energy in the shape memory actuator is released and propels the projectile. Releasing the stored energy includes heating the shape memory actuator, tensioning the shape memory actuator, and fracturing the tensioned shape memory actuator at a fracture locus to propel the projectile away from the fracture locus.

32 Claims, 11 Drawing Sheets

(56) References Cited

U.S. PATENT DOCUMENTS

| | | | | |
|---|---|---|---|---|
| 5,273,116 | A | * | 12/1993 | Ross .............................. 166/302 |
| 5,440,193 | A | * | 8/1995 | Barrett .......................... 310/328 |
| 5,722,709 | A | | 3/1998 | Lortz et al. |
| 5,916,466 | A | | 6/1999 | Dixon |
| 6,126,371 | A | | 10/2000 | McCloskey |
| 6,247,493 | B1 | * | 6/2001 | Henderson ................. 137/487.5 |
| 6,321,654 | B1 | * | 11/2001 | Robinson ...................... 102/251 |
| 6,352,494 | B2 | * | 3/2002 | McAlonan ...................... 482/77 |
| 6,622,971 | B1 | | 9/2003 | Robertson |
| 6,843,465 | B1 | * | 1/2005 | Scott ........................ 251/129.06 |
| 6,863,447 | B2 | | 3/2005 | Gilleo ............................. 385/78 |
| 6,918,545 | B2 | * | 7/2005 | Franson et al. ................. 239/37 |
| 7,331,616 | B2 | * | 2/2008 | Brei et al. ..................... 292/100 |
| 7,396,182 | B2 | | 7/2008 | Retat et al. |
| 7,422,403 | B1 | * | 9/2008 | Johnson et al. .............. 411/82.5 |
| 7,476,224 | B2 | * | 1/2009 | Petrakis ..................... 604/890.1 |
| 7,947,937 | B1 | * | 5/2011 | Langner ....................... 244/3.16 |
| 8,056,335 | B1 | * | 11/2011 | Brown ............................ 60/528 |
| 8,172,458 | B2 | * | 5/2012 | Petrakis ......................... 374/101 |
| 8,367,151 | B2 | * | 2/2013 | O'Brien et al. .............. 427/2.25 |
| 8,418,455 | B2 | | 4/2013 | Lyman et al. |
| 2002/0127384 | A1 | | 9/2002 | Mulligan et al. |
| 2002/0187020 | A1 | * | 12/2002 | Julien ........................... 411/544 |
| 2003/0128491 | A1 | | 7/2003 | Bueno Ruiz et al. |
| 2005/0136270 | A1 | | 6/2005 | Besnoin et al. |
| 2006/0273876 | A1 | * | 12/2006 | Pachla et al. .................. 337/140 |
| 2008/0034750 | A1 | | 2/2008 | Gao et al. |
| 2009/0095493 | A1 | * | 4/2009 | Johnson et al. ................. 169/19 |
| 2009/0314890 | A1 | | 12/2009 | Koehler et al. |
| 2010/0117663 | A1 | | 5/2010 | Herrera et al. |
| 2010/0139264 | A1 | | 6/2010 | Lyman et al. |
| 2010/0215424 | A1 | * | 8/2010 | Crookston et al. ................. 403/6 |
| 2011/0232562 | A1 | | 9/2011 | Koehler et al. |
| 2011/0234362 | A1 | | 9/2011 | Koehler et al. |

OTHER PUBLICATIONS

International Application Serial No. PCT/US2009/06471, Written Opinion mailed Mar. 11, 2010, 9 pgs.

International Application Serial No. PCT/US2009/06471, Search Report mailed Mar. 11, 2010, 3 pgs.

Roberto, G., "A non-pyrotechnic mUltipoint release system for deployable telescope activated by shape memory alloy wires", Abstracts of the 55th International Astronautical Congress 2004, Vancouver, Canada. Oct. 4-8, 2004., 1 pg.

U.S. Appl. No. 12/332,004, Corrected Notice of Allowance mailed Mar. 27, 2012, 2 pgs.

U.S. Appl. No. 12/332,004, Examiner Interview Summary mailed Jan. 24, 2012, 3 pgs.

U.S. Appl. No. 12/332,004, Examiner Interview Summary mailed Aug. 10, 2012, 3 pgs.

U.S. Appl. No. 12/332,004, Final Office Action mailed Oct. 20, 2011, 9 pgs.

U.S. Appl. No. 12/332,004, Non Final Office Action mailed Apr. 6, 2012, 8 pgs.

U.S. Appl. No. 12/332,004, Notice of Allowance mailed Dec. 13, 2012, 6 pgs.

U.S. Appl. No. 12/332,004, Response filed Jan. 20, 2012 to Final Office Action mailed Oct. 20, 2012, 7 pgs.

U.S. Appl. No. 12/332,004, Response filed Aug. 2, 2012 to Non Final Office Action mailed Apr. 6, 2012, 10 pgs.

U.S. Appl. No. 12/332,004, Response filed Jul. 20, 2011 to Non Final Office Action mailed May 10, 2011, 7 pgs.

U.S. Appl. No. 13/155,581, Non Final Office Action mailed Apr. 4, 2013, 27 pgs.

International Application Serial No. PCT/US2009/06471, International Preliminary Report on Patentability mailed Jun. 23, 2011, 7 pgs.

Braun, Simon G, "Encyclopedia of Vibration", vols. 1-3. Elsevier, (2002), 1145-1148.

U.S. Appl. No. 13/155,581, Final Office Action mailed Oct. 25, 2013, 31 pgs.

U.S. Appl. No. 13/155,581, Response filed Jul. 13, 2013 to Non Final Office Action mailed Apr. 4, 2013, 23 pgs.

U.S. Appl. No. 13/155,592, Non Final Office Action mailed Sep. 18, 2013, 6 pgs.

* cited by examiner

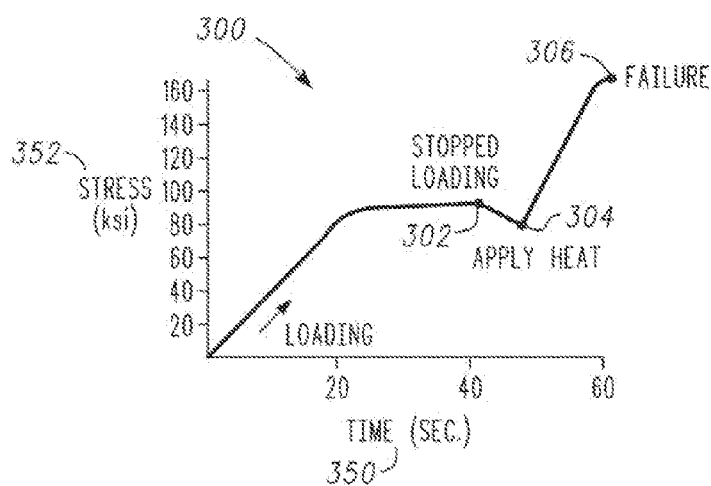
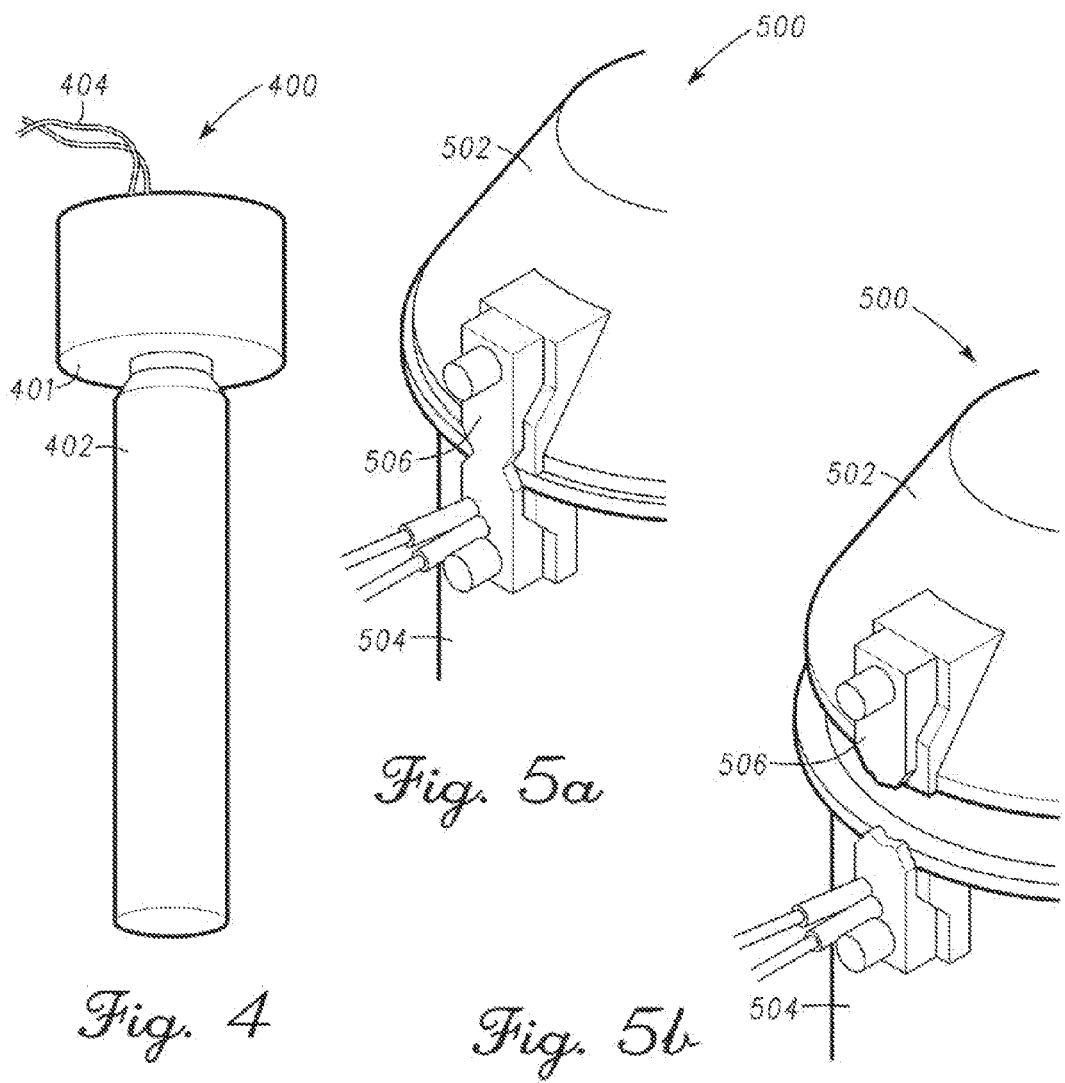

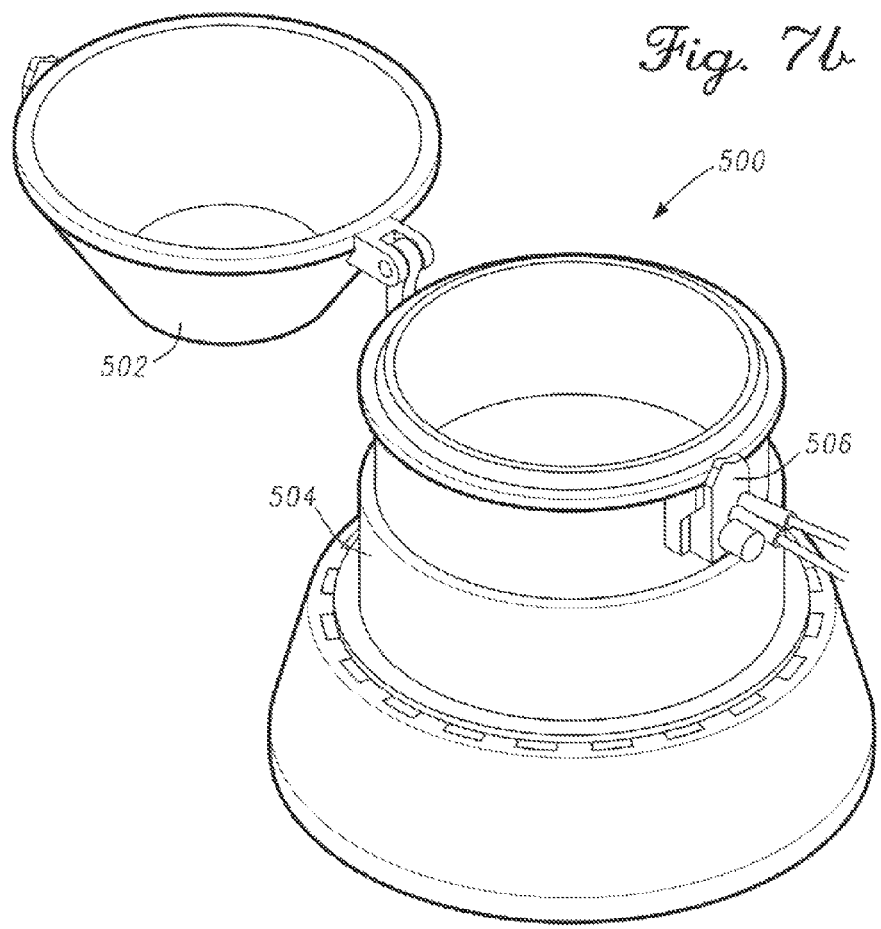
Fig. 7b
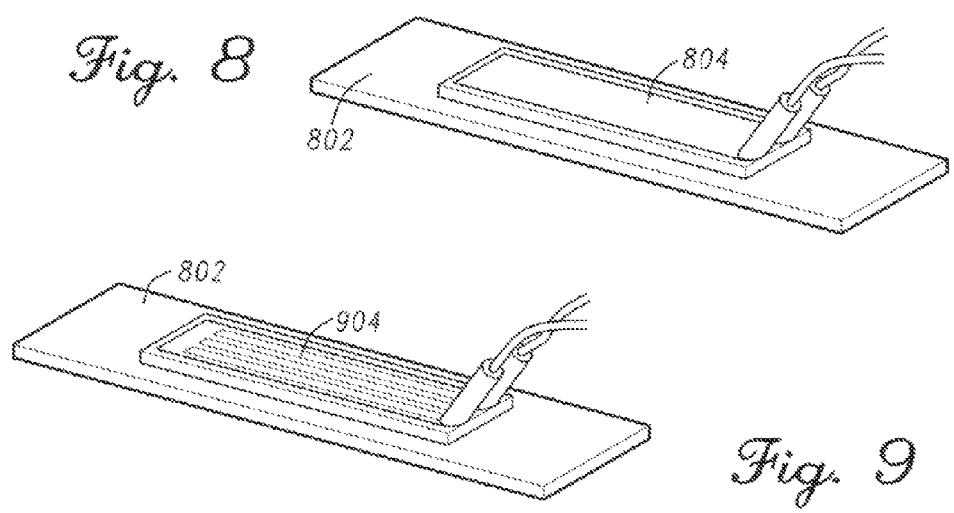
Fig. 8
Fig. 9

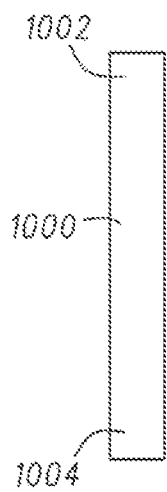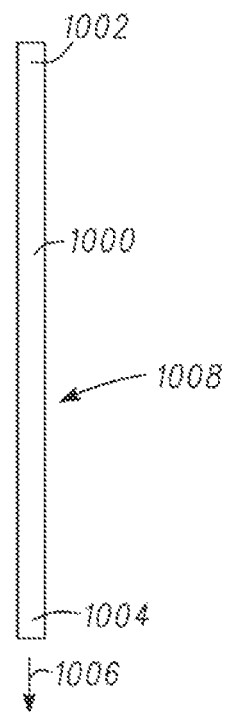
Fig. 10a
Fig. 10b

SHAPE MEMORY STORED ENERGY ASSEMBLIES AND METHODS FOR USING THE SAME

CROSS REFERENCE TO RELATED APPLICATION

This application is a continuation-in-part of commonly owned co-pending U.S. patent application Ser. No. 12/332,004, filed Dec. 10, 2008, now U.S. Pat. No. 8,418,455 and entitled, "Shape Memory Alloy Separating Apparatuses", which is incorporated herein by this reference.

FIELD

The present disclosure relates generally to shape memory alloy apparatuses. In an embodiment, the disclosure relates to shape memory stored energy assemblies for actuating other devices.

BACKGROUND

A variety of apparatuses may be used for actuating objects or holding together objects that need to be later released. For example, an explosive bolt can be used to attach two or more objects and may later release the objects with an explosive force. An explosive bolt incorporates explosives that cause an explosion when initiated or triggered. The explosion breaks apart the explosive bolt to release the objects. Because of the explosives used in explosive bolts their use includes at least some risk and requires skilled technicians and extensive procedures to ensure the bolts are handled safely. Additionally, explosives exert explosive and acoustic shock loads that may damage fragile machinery, sensitive electronic components and the like. Further, explosive actuating systems may generate significant heat that may adversely affect the operation of components sensitive to spikes in temperature.

Moreover, explosive reactions configured to actuate objects, such as explosive bolts generate shrapnel (foreign object debris or FOD). Explosively propelled FOD can damage sensitive components and thereby interrupt or hamper operation of those components. An explosive actuator may operate as intended but the FOD generated (as well as the explosive and acoustic shock, heat and the like) may undesirably cause damage necessitating repair or replacement of equipment damaged through operation of the actuator.

SUMMARY

In an embodiment, a separating apparatus is provided that comprises a pre-strained member formed from a shape memory alloy. This member is configured to separate upon application of heat and the separation is configured to actuate an object.

In another embodiment, an apparatus is provided that comprises a first object, a second object, and a separating apparatus that is configured to couple the first object to the second object. In this example, the separating apparatus is formed from a shape memory alloy and is configured to separate upon application of heat.

In yet another embodiment, a separating apparatus is provided that comprises a pre-strained member configured to couple a first object to a second object. The member is formed from a shape memory alloy and is configured to separate and release the first object from the second object upon application of heat.

In still yet another embodiment, a method is provided for actuating an object that is configured to be in contact with an actuator. The actuator has a pre-strained member formed from a shape memory alloy and is configured to be in contact with the actuator. In this method, heat is applied to the member and the application of heat is configured to cause the member to separate, where the separation is configured to actuate the object.

In an additional embodiment, devices, assemblies and methods are provided for propelling a projectile with a shape memory actuator. For instance, the shape memory actuator is coupled at an end of the actuator with a projectile. The shape memory actuator is anchored and transition of the actuator from a strained configuration causes it to fracture. The potential energy developed as the shape memory actuator tensions during transition is converted to kinetic energy upon fracture of the actuator. The kinetic energy is delivered to the projectile coupled with the shape memory actuator and propels the projectile accordingly. The velocity and corresponding kinetic energy of the projectile are readily tunable based on the specified mass of the projectile, the amount of strain initially imparted to the shape memory actuator, the volume of the actuator, the actuator material and the location of the fracture locus.

The devices, assemblies and methods described herein propel a projectile without using an explosive reaction. Instead, the shape memory actuator provides a controlled and directed application of kinetic energy along the projectile only. The safety risk involved with shape memory stored energy devices is thereby minimal relative to a corresponding explosive device. Further, the shape memory actuator does not generate explosive or acoustic shock that would otherwise harm sensitive electronics, machinery or optical assemblies. In a similar manner, because there is not an explosive, the shape memory actuator does not generate or transmit heat to sensitive components.

Additionally, the shape memory actuator does not fragment as is the case with an explosive device. FOD and the like are thereby not generated. The shape memory stored energy devices and assemblies described herein retain the projectile and the shape memory actuator (in strained and fractured configurations) adjacent to the projectile housing to ensure there is no FOD. Sensitive electronic and mechanical components may thereby be positioned in close proximity to the shape memory stored energy devices and assemblies with substantially no risk to the components with fracture of the shape memory actuator. Stated another way, the shape memory stored energy devices and assemblies described herein capture all of their moving parts including the actuator when fractured, the projectile and the like and substantially prevent the scattering of the parts within a larger equipment assembly (e.g., and engine, optical assembly, rocket and the like).

BRIEF DESCRIPTION OF DRAWINGS

The present disclosure is illustrated by way of example and not limitation in the figures of the accompanying drawings, in which like references indicate similar elements and in which:

FIG. 3 illustrates a plot of the mechanical behavior of a shape memory alloy with the application of heat, in accordance with an embodiment of the invention;

FIG. 4 illustrates an example of a separating apparatus, in accordance with an embodiment of the invention;

FIGS. 5a and 5b illustrate another embodiment of a separating apparatus used in a telescope assembly;

FIGS. 7a and 7b illustrate the use of a separating apparatus to actuate an object upon release, in accordance with an embodiment of the invention;

FIG. 8 illustrates an exothermic reactive foil according to an embodiment of the invention that may be used to generate heat; and FIG. 9 illustrates resistance wires according to another embodiment of the invention that may also be used to generate heat.

FIG. 10A illustrates one example of a shape memory actuator in an unstrained configuration.

FIG. 10B illustrates the shape memory actuator of FIG. 10A in a strained energy stored configuration.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

The embodiments described herein provide a variety of separating apparatuses formed from shape memory alloys. An embodiment of the apparatus is an actuator formed from a shape memory alloy. An "actuator," as used herein, refers to an apparatus, mechanism, or mechanical device that is configured to activate or put an object, which is configured to be in contact with the actuator, into motion by imparting directly or indirectly kinetic energy to the object. Another embodiment of the apparatus is a coupling apparatus formed from a shape memory alloy. A "coupling apparatus," as used herein, refers to a mechanical device or mechanism that is configured to couple or hold together two or more objects. A fastener is an example of a coupling apparatus, which, for example, includes bolts, hooks, snaps, screws, nails, pins, rings, pins, and other fasteners. The apparatuses or portions of the apparatuses are formed from a shape memory alloy that exhibits a shape memory effect where, as described in more detail below, the shape memory alloy can be deformed and then returned to its original shape when heated.

Figures 1A, 1B, 1C, 1D:
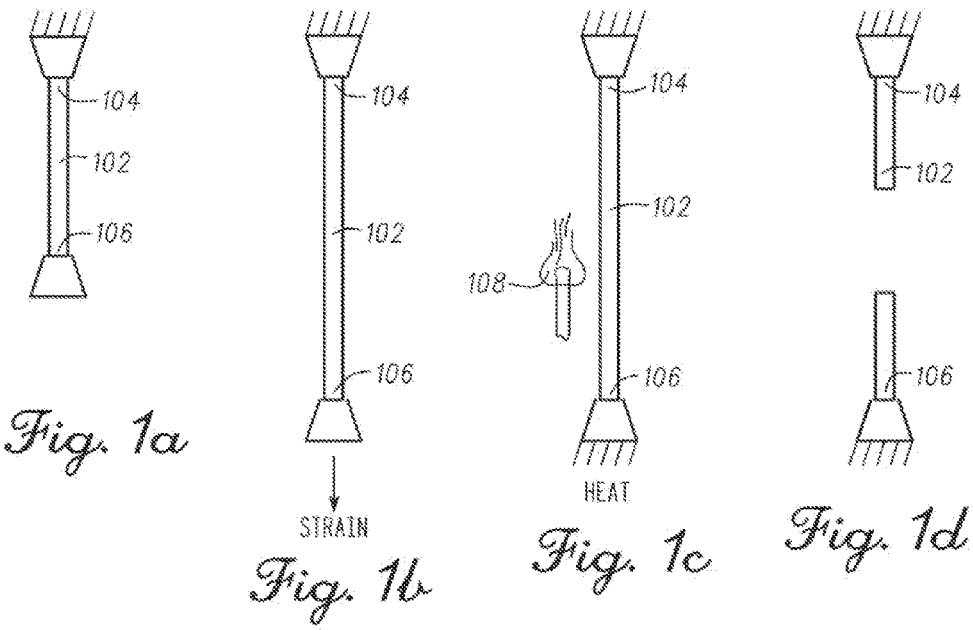
FIGS. 1a, 1b, 1c, and 1d illustrate the use of heat to separate a separating apparatus formed from a shape memory alloy, in accordance with an embodiment of the invention.

As illustrated in FIGS. 1a-1d, this shape memory effect may be used to separate a separating apparatus. FIG. 1a illustrates a member 102 of a separating apparatus formed from a shape memory alloy, in accordance with an embodiment of the invention. As used herein, a "member" refers to a constituent part of a separating apparatus and, in the example of FIG. 1a, the member 102 is in the shape of a bar having two opposing ends 104 and 106 that, as shown in FIG. 1b, are held in place and pulled in opposite directions such that the member 102 is under strain. As illustrated in FIG. 1c, the opposing ends 104 and 106 are fixed in place and a heating source 108 applies heat to the member 102, and upon application of heat, the member 102 separates into two pieces because of the shape memory effect. As used herein, to "separate" is to come apart caused by a break or fracture in the separating apparatus. As described in more detail below, such a unique property of shape memory alloys can be used as a release mechanism for a coupling apparatus or used to actuate an object.

Figure 2:
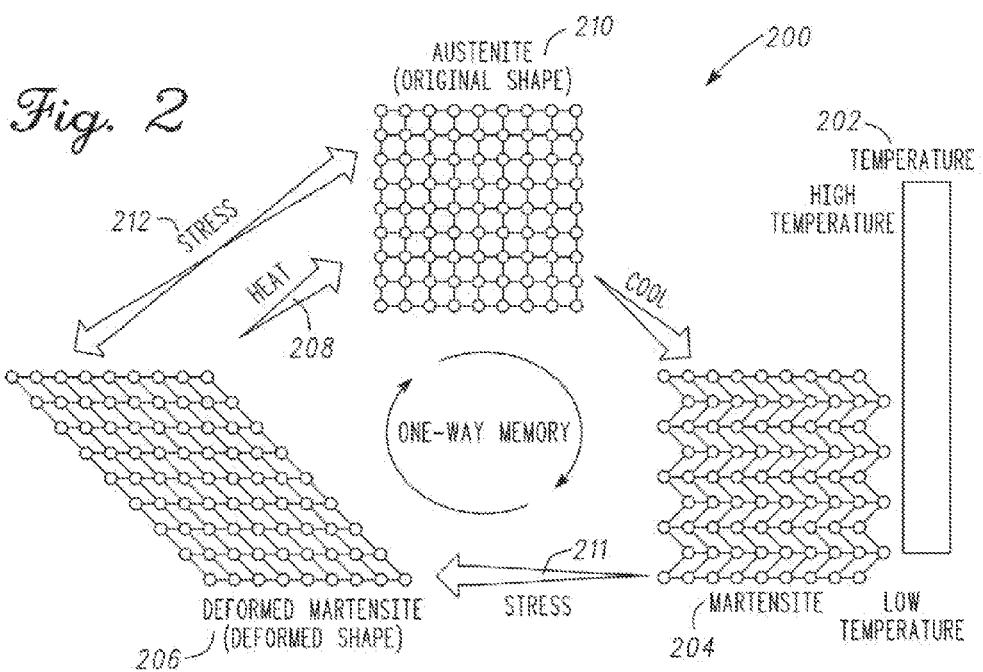
FIG. 2 is a diagram illustrating the various solid phases of a shape memory alloy at different temperatures and stress states.

FIG. 2 is a representative diagram 200 illustrating the various solid phases of a shape memory alloy at different temperatures and stress states. The diagram 200 includes a temperature reference 202 identifying a temperature increasing from a low temperature at the bottom of the diagram 200 to a high temperature at the top of the diagram 200. Additionally, the diagram 200 illustrates the different solid phases or crystal structures of a shape memory alloy at temperatures identified by the temperature reference 202.

It should be appreciated that shape memory alloys undergo a temperature related phase change that is characterized by the memory of a mechanical configuration imposed on the material at an annealing temperature. When the shape memory alloy is below some lower temperature, the alloy possesses a particular crystal structure whereby it may be deformed into an arbitrary shape with relative ease. Upon heating the alloy above a higher temperature, the alloy undergoes a change in crystal structure and the shape memory effect is manifested by a resumption of the originally imparted shape, representing the onset of a restoring stress.

FIG. 2 shows a pictorial diagram illustrating the shape memory effect of an example material formed from a shape memory alloy. At a low temperature (e.g., at room temperature), the shape memory alloy is in a martensite phase 204 where the shape memory alloy has a body centered tetragonal crystal structure and may be relatively soft and deformable. When stress 211 is applied to the martensite phase 204, the shape memory alloy is deformed and transformed into a deformed martensite phase 206. For example, the shape memory alloy in the martensite phase 204 may be stretched, compressed, and/or sheared such that it takes on a deformed shape that is in a deformed martensite phase 206. In the deformed martensite phase 206, the atoms may move past each other, but the bonds are not broken, and the atoms are still relatively placed to each other in the same position as the martensite phase 204.

Upon application of heat 208 to the shape memory alloy in the deformed martensite phase 206, which results in heating the shape memory alloy to a high temperature, the shape memory alloy inherently returns to its original shape. It should be noted that the imposition of stress 211 on the shape memory alloy in the martensite phase 204 is one way and causes the deformation of the material (e.g., into the deformed martensite phase 206) that will not go back to its unstressed or pre-stressed form until heat 208 is applied. On the other hand, stress 212 imparted in the austenite phase 210, which is explained in more detail below, is a bidirectional phase change in that when the stress 212 is removed, the shape memory alloy returns back to its unstressed form (e.g., deformed shape) without the addition of heat 208.

In the original shape, the shape memory alloy is in an austenite phase 210, which has a cubic crystal structure. When cooled to a low temperature, the shape memory alloy in the austenite phase 210 transitions back to the martensite phase 204. Unlike other metals, this transition between the phases (austenite phase 210 to martensite phases 204 and 206) is reversible and repeatable. It should be appreciated that a large amount of energy is stored in the deformed martensite phase 206, and this energy used by the shape memory alloy to return to its original shape can also be used to separate the shape memory alloy. Examples of shape memory alloys that exhibit the phases illustrated in FIG. 2 include nickel-titanium alloys (e.g., Nitinol), titanium-nickel alloys, copper-zinc-aluminum alloys, copper aluminum nickel alloys, nickel titanium hafnium alloys, and other shape memory alloys.

FIG. 3 illustrates a plot 300 of the mechanical behavior of a shape memory alloy with the application of heat, in accordance with an embodiment of the invention. The plot 300 is a stress versus time curve of a shape memory alloy where the horizontal axis 350 defines time and the vertical axis 352 defines the stress applied to a shape memory alloy.

As depicted in FIG. 3, the shape memory alloy is loaded or stressed (e.g., pulled, compressed, and/or sheared) for a duration of approximately 40 seconds at a constant strain rate at which point 302 the loading is stopped. Thereafter, at point 304, heat is applied to the shape memory alloy and as a result, the shape memory alloy is further stressed because it wants to return to its original shape. With sufficient stress (e.g., at approximately 160 ksi), the shape memory alloy separates or fails at point 306 of the plot 300.

FIG. 4 illustrates an example of a separating apparatus, in accordance with an embodiment of the invention. The separating apparatus may be in the form of a fracturing bolt 400, which is a type of coupling apparatus, that refers to a variety of fastening rods, pins, or screws that are configured to couple two or more objects together and also configured to separate (or fracture). The fracturing bolt 400 of FIG. 4 comprises a threaded cylindrical shaft member 402 with a head member 401 attached to the cylindrical shaft member 402. Here, both the head member 401 and the cylindrical shaft member 402 are formed from a shape memory alloy. Additionally attached to the fracturing bolt 400 are electrical wires 404 (or electrical leads).

The fracturing bolt 400 is pre-strained. A separating apparatus (e.g., the fracturing bolt 400) is pre-strained when it is preloaded to a predetermined strain value. That is, a separating apparatus is pre-strained when its body or structure is deformed as a result of an applied force. The fracturing bolt 400 is pre-strained such that when heat is applied to the member 402, the member 402 is configured to separate into two pieces. In an embodiment, the heat may be generated by resistance heating, which refers to a process in which heat is generated by passing an electric current through a conductor, such as the threaded cylindrical shaft member 402. In the example of FIG. 4, an electric current may be applied to the cylindrical shaft member 402 by way of the electrical wires 404 to generate heat in the cylindrical shaft member 402. In addition to resistance heating, a variety of other techniques to generate heat may be used, in accordance with other embodiments, which is explained in more detail below.

FIGS. 5a and 5b illustrate another embodiment of a separating apparatus used in a telescope assembly 500. As depicted in FIG. 5a, a telescope assembly 500 is comprised of objects, such as a cover 502 and a housing assembly 504, that are coupled together by a separating apparatus 506 in the form of a coupling apparatus. The separating apparatus 506 is a plate with two holes at both ends of the plate that fit into pegs of the cover 502 and the housing assembly 504, which, when fitted, prevents the cover 506 from being opened or detached from the housing assembly 504.

In this example, heat may be applied to the separating apparatus 506 by resistance heating where an electric current is applied to the separating apparatus 506. As depicted in FIG. 5b, the separating apparatus 506 separates into two pieces when heated and the separation thereby releases the cover 502 from the housing assembly 504 such that the cover 502 can be opened. In another embodiment, the separating apparatus 506, as explained in more detail below, can also be an actuator configured to actuate the cover 502 when separated.

Figure 6:
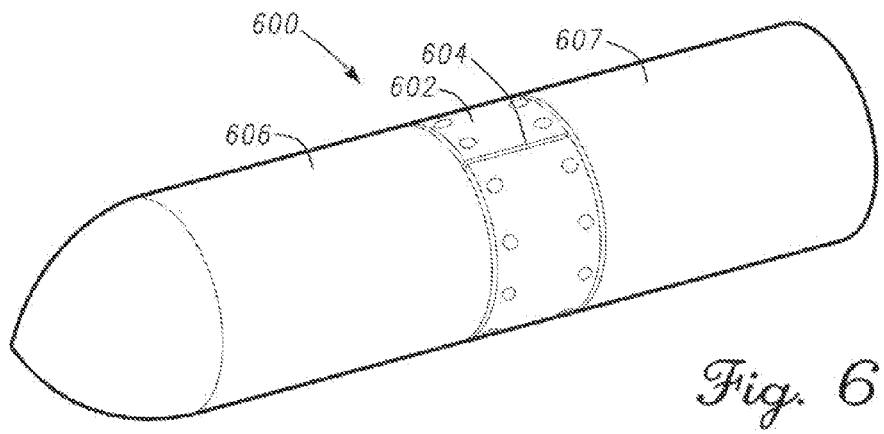
FIG. 6 illustrates yet another embodiment of a separating apparatus used in a multistage rocket.

FIG. 6 illustrates yet another embodiment of a separating apparatus 602 used in a rocket 600. The rocket 600 is a multistage rocket that comprises a first stage 606 mounted above a second stage 607 that are held together by a separating apparatus 602 in the form of a coupling apparatus. Each first stage 606 or second stage 607 contains its own engine and propellant. In effect, two rockets (first stage 606 and second stage 607) are stacked on top of each other. In this example, the separating apparatus 602 is a sleeve formed from a shape memory alloy and is configured to wrap around and couple the first stage 606 to the second stage 607.

Upon application of heat to the separating apparatus 602, the separating apparatus 602 separates to allow the first stage 606 to separate from the second stage 607. It should be noted that the location of the separation may be defined by machining a notch 604 into the separating apparatus 602 such that the separating apparatus 602 separates at the notch 604. The separating apparatus 602 illustrated in FIG. 6 may be used to replace traditional explosive mandrels with sheared rivets or traditional explosive bolts currently used to separate the first stage 606 from the second stage 607 of the rocket 600. The separating apparatus 602 has fewer parts when compared with traditional explosive mandrels and traditional explosive bolts, thereby resulting in a more reliable mechanism to allow the separation of the first stage 606 from the second stage 607.

Figure 7A:
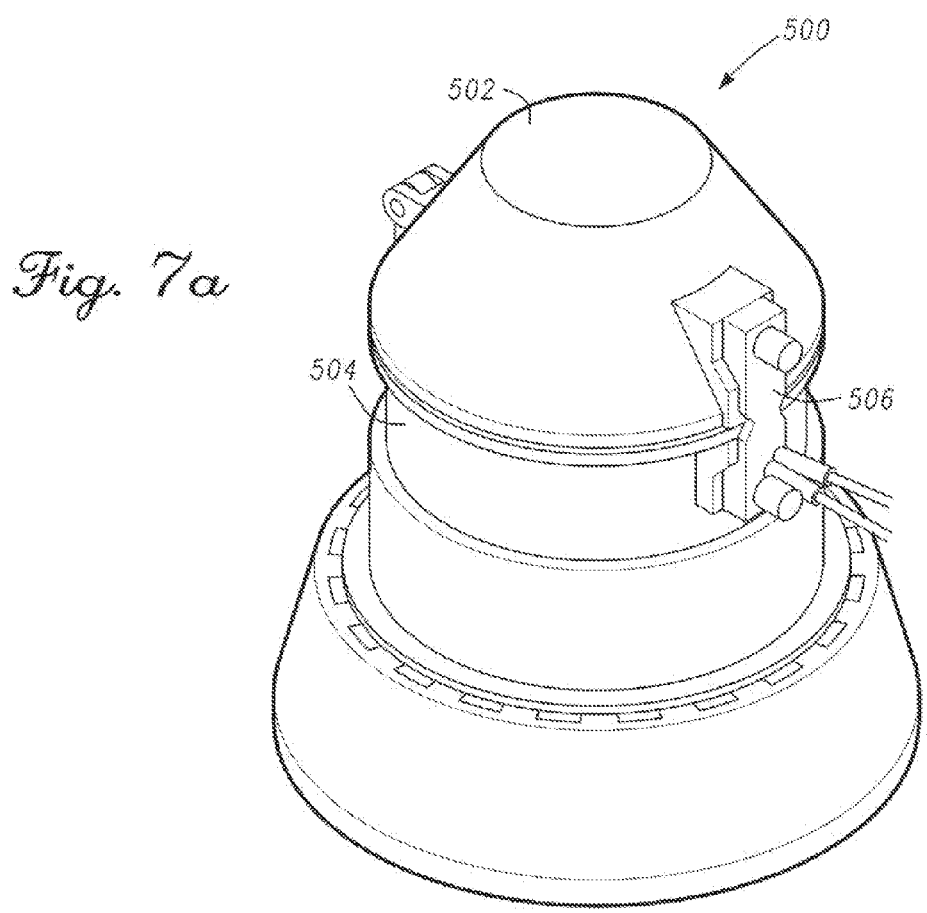

FIGS. 7a and 7b illustrate the use of a separating apparatus 506 to actuate an object upon release, in accordance with an embodiment of the invention. As illustrated in FIG. 7a and also discussed above, a telescope assembly 500 includes a cover 502 and a housing assembly 504 that are coupled together by a separating apparatus 506 formed from a shape memory alloy. In this embodiment, the separating apparatus 506 is in the form of an actuator that stores a large amount of mechanical energy that, when released, may be used to actuate an object.

For example, as illustrated in FIG. 7b, the separating apparatus 506 separates upon the application of heat, and this separation releases or imparts a large amount of kinetic energy to the cover 502 such that the energy snaps open the cover 502. As a result, in addition to releasing the cover 502 from the housing assembly 504, heat may, in effect, also be used to actuate or open the cover 502.

FIG. 8 illustrates an exothermic reactive foil 804 according to an embodiment of the invention that may be used to generate heat. As discussed above, in addition to resistive heating, a variety of other heating techniques may be used to generate heat. For example, in an embodiment, a reactive foil 804 that may be used. In general, a reactive foil 804 is comprised of layers of metals or other materials (e.g., aluminum layers and/or nickel layers) that, when activated by an electric current, chemically react to deliver localized heat. An example of a reactive foil 804 is NANOFOIL®.

As illustrated in FIG. 8, the reactive foil 804 is attached to or deposited on a surface 802 of a separating apparatus 802 by way of, for example, a conductive adhesive. When an electric current is applied to the reactive foil 804, the electric current initiates a chemical reaction in the reactive foil 804 that results in an almost immediate, localized heating of the separating apparatus 802 that is used to separate the separating apparatus 802.

FIG. 9 illustrates resistance wires 904 according to another embodiment of the invention that may also be used to generate heat. A resistance wire 904 is an electrical wire with a high electrical resistivity and is configured to generate heat upon application of an electric current. The resistance wire 904 may, for example, be formed from a nickel-chromium alloy.

As depicted in FIG. 9, resistance wires 904 are attached to a surface of the separating apparatus 802 using, for example, a conductive adhesive. When an electric current is applied to the resistance wires 904, the electric current causes the resistance wires 904 to generate heat, which is used to separate the separating apparatus 802.

FIGS. 10A and 10B show one example of a shape memory substrate 1000, such as a shape memory actuator, in an unstrained configuration (FIG. 10A) and a strained configuration 1008 (FIG. 10B). As shown in FIG. 10A, the shape memory substrate 1000 extends between first and second substrate ends 1002, 1004. One example of the shape memory substrate 1000 is constructed with a shape memory material including, but not limited to, Nitinol, copper-zinc-aluminum alloys, copper-aluminum-nickel alloys, nickel-titanium-hafnium alloys and other shape memory materials. Further, as previously described, in one example, the shape memory substrate 1000 is provided in an initial martensitic phase. The shape memory material is in the martensitic phase after transition from an austenitic phase. For instance, the material is cooled from the austenitic phase to the martensitic phase as previously described herein. Referring now to FIG. 10B, in the martensitic phase the shape memory substrate 1000 is exposed to one or more stresses 1006. As shown in FIG. 10B, the stress 1006 is provided along a longitudinal axis of the shape memory substrate 1000 (e.g., an axis coincident to the stress 1006). The applied stress 1006 transitions the shape memory substrate 1000 into the strained configuration 1008 wherein the shape memory substrate 1000 is deflected and has a longer length than that provided in FIG. 10A. The shape memory substrate 1000 is strained from around 1 to 10 percent relative to the unstrained length of the shape memory substrate 1000 shown in FIG. 10A.

As will be described in further detail below, the shape memory substrate 1000 described herein forms a shape memory actuator that transforms stored potential energy from strain and subsequent tensioning of the substrate into kinetic energy that propels a projectile in a desired direction and with a desired force. The shape memory substrate 1000 actuates the projectile when the substrate is exposed to a temperature at or above a specified range of transition temperatures that cause the substrate 1000 to transition from the strained energy stored configuration to a fractured kinetic delivery configuration (shown below). Fracture of the shape memory substrate 1000 propels the projectile coupled with the substrate without an explosive reaction and substantially minimizes fragmentation (e.g., little or no FOD is generated). As will be described in further detail below, the shape memory substrate 1000 (also called a shape memory actuator herein) is actively operated, for instance with heating elements, foils, films and the like coupled with the substrate 1000 or adjacent to the substrate. In another example, the shape memory substrate 1000 is operated according to ambient temperatures, and is thereby triggered when ambient temperatures rise to or above the specified range of transition temperatures (or a single transition temperature).

The shape memory substrates 1000 described herein are readily tunable to change phases according to a desired transition temperature (or range of temperatures). For instance, the selection of shape memory materials, the thermal and mechanical conditioning of the materials, the thickness and width of the substrate 1000 (e.g., its volume) and one or more of the stress and strain applied to the shape memory substrate 1000 cooperate to determine the transition temperature of the shape memory substrate 1000 (e.g., the temperature that the substrate will fracture when the first and second substrate ends 1002, 1004 are fixed in place). Tuning of the shape memory substrate 1000 to transition phases at a specified temperature or range of temperatures provides a reliable and accurate system configured to propel a projectile at a set predefined threshold. Stated another way, the shape memory substrate 1000 is chosen and constructed (e.g., by material selection, size of the substrate, conditioning and the like) to transition from the strained energy stored configuration to the fractured kinetic delivery configuration and accordingly propel the projectile when exposed to a specified transition temperature (or range of temperatures).

Figure 10C:
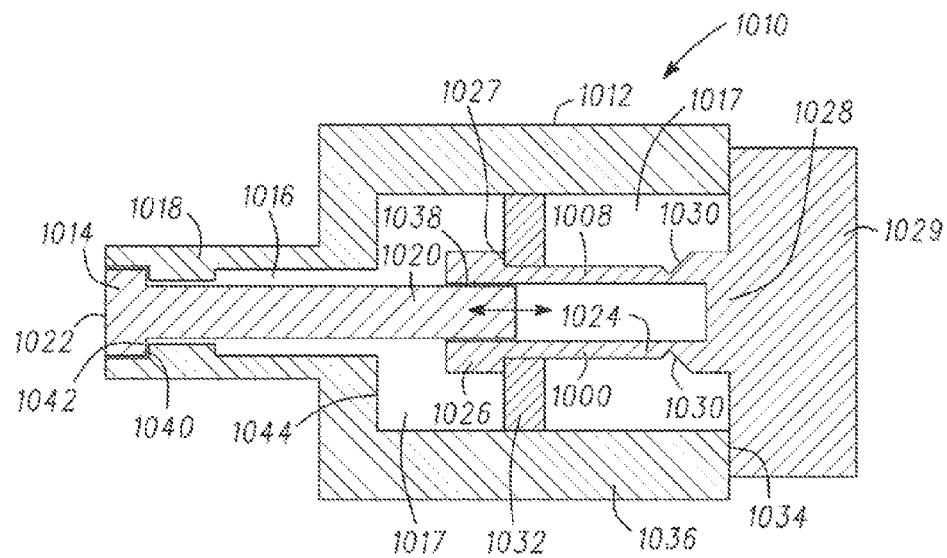
FIG. 10C illustrates one example of a shape memory stored energy device including a projectile with the shape memory actuator in the strained energy stored configuration.

Referring now FIG. 10C, one example of a shape memory stored energy assembly (or device) 1010 is provided including the shape memory actuator 1000. The shape memory stored energy assembly 1010 includes a projectile housing 1012 sized and shaped to contain a projectile 1014 as well as the shape memory actuator 1000 therein. As shown, the projectile 1014 is, in one option, provided within a projectile lumen 1016 of a projectile barrel 1018. The projectile barrel has a smaller diameter complementary to the projectile 1014 that extends from the remainder of the projectile housing 1012. As shown in FIG. 10C, the projectile barrel 1018 is sized and shaped to correspondingly fit around the projectile 1014 and thereby guide and direct the projectile 1014 when propelled by fracture of the shape memory actuator 1000. The projectile housing 1012 is constructed with robust materials configured to restrain the shape memory actuator 1000 during transition from the strained to a fractured kinetic delivery configuration. The projectile housing 1012 is constructed with, but not limited to, metals, composites and the like such as steel, aluminum, titanium and other similarly robust materials.

As shown in FIG. 10C, the projectile 1014 includes a projectile anchored end 1020 and a projectile contact end 1022. The projectile contact end 1022 is sized and shaped to contact one or more fixed features, for instance, fastener heads, tubes and the like to actuate one or more of those features and thereby change its function. For instance, the projectile contact end 1022 is configured to violently strike one or more of a fastener head, tube and the like and thereby sever a tube, remove a fastener head, and the like. As will be described in further detail below, the projectile includes one or more configurations for the projectile contact end 1022, such as a hammer or cutting surface. In one example, the projectile 1014 is constructed with, but not limited to, metals, composites and the like including titanium, steel, aluminum and other similar materials.

Referring again to FIG. 10C, the shape memory actuator 1000 positioned within the projectile 1012 includes first and second actuator ends 1026, 1028. In one example, the first and second actuator ends 1026, 1028 correspond in at least some regards with the first and second substrate ends 1002, 1004 shown in FIGS. 10A and 10B. As shown in FIG. 10C, the actuator body 1024 and the shape memory actuator 1000 including the first and second actuator ends 1026, 1028 is anchored between first and second anchors 1032, 1034. The first and second anchors 1032, 1034, in one example, are incorporated into the projectile housing 1012. For instance, the first anchor 1032 includes an annular flange extending around the actuator body 1024 and the first actuator end 1026. As shown, the first actuator end 1026 includes an actuator flange 1027, in one example, engaged with the first anchor 1032. In another example, the second anchor 1034 is included in a portion of one end of the projectile housing 1012. The shape memory actuator 1000, in another example, includes an actuator base 1029 at the second actuator end 1028 configured to engage with the second anchor 1034. The second anchor 1034 thereby cooperates with the first anchor 1032 to anchor the shape memory actuator 1000 therebetween. As further shown in FIG. 10C, the projectile housing 1012 includes a brace 1036 incorporated as part of the projectile housing. The brace 1036 extends between the first and second anchors 1032, 1034 and thereby provides support to the first and second anchors 1032, 1034 to thereby hold the first and second actuator ends 1026, 1028 statically while the shape memory actuator 1000 transitions from the strained stored energy configuration 1008 to the fractured kinetic delivery configuration shown, for instance, in FIG. 10D.

As shown in FIG. 10C, the shape memory actuator 1000 includes a fracture locus 1030. In one example, the fracture locus 1030 includes a notch formed in the shape memory actuator 1000, for instance by cutting, molding, coining and the like. The fracture locus 1030 shown in FIG. 10C is positioned remotely from the projectile anchor end 1020 and the corresponding first actuator end 1026. Stated another way, the fracture locus 1030 is shown adjacent to the second actuator end 1028. By positioning the fracture locus 1030 adjacent to the second actuator end 1028 and remote from the projectile anchor end 1020 (and the first actuator end 1026) tensioning of the shape memory actuator 1000 and tsubsequent fracture ensures that the kinetic energy generated by the shape memory actuator 1000 is substantially delivered to the projectile 1014. Stated another way, as the shape memory actuator 1000 fractures tension is released and converted to kinetic energy within the shape memory actuator 1000 according to the volume of the fractured components of the shape memory actuator 1000. By ensuring the majority of the volume of the shape memory actuator 1000 is coupled with projectile 1014 the corresponding generated kinetic energy is thereby transmitted to the projectile 1014 by the large volume of the shape memory actuator 1000 that remains coupled to the projectile 1014. In other examples, the fracture locus 130 is positioned nearer to the projectile anchor end 1020 to tune the amount of kinetic energy transmitted to the projectile and correspondingly delivered by the projectile 1014 upon contact.

As shown in FIG. 10C, the projectile 1014 is coupled with the shape memory actuator 1000 at the intersection of the projectile anchor end 1020 and the first actuator end 1026. For instance, one or more of the projectile 1014 and the shape memory actuator 1000 includes a projectile fitting 1038 (e.g., adhesives, welds, threading, mechanical fittings and the like) configured to ensure the projectile 1014 remains coupled to the shape memory actuator 1000 while the shape memory actuator 1000 is in the strained stored energy configuration 1008 shown in FIG. 10C and the fractured kinetic delivery configuration shown in FIG. 10D.

As previously described, the shape memory stored energy assembly (or device) 1010 shown in FIG. 10C includes the shape memory actuator 1000 in the strained stored energy configuration 1008. The shape memory actuator 1000 is installed within the projectile housing 1012 in the strained stored energy configuration 1008. In one example, the shape memory actuator 1000 is installed in the projectile housing without tensioning between the first and second anchor 1032, 1034. The shape memory actuator is installed within the projectile housing in a slightly relaxed configuration (though still pre-strained) where the first and second actuator ends 1026, 1028 are engaged with the corresponding first and second anchors 1032, 1034 without tensioning of the actuator body 1024 therebetween. As previously described, the shape memory actuator 1000 is installed in a pre-strained configuration according to the properties of the shape memory material included in the shape memory actuator. By installing the shape memory actuator 1000 in a strained but non-tensioned configuration the shape memory actuator is not subject to gradual creep over its operational lifetime before transition of the shape memory actuator 1000 to the fractured kinetic delivery configuration. The shape memory actuator 1000 is thereby able to provide reliable and predetermined performance (e.g., kinetic energy, force transmitted and the like) after being stored for large spans of time, for instance, five or more years.

As previously described herein, the shape memory actuator 1000 is operated according to exposure to one or more specified transition temperatures (e.g., or one specified transition temperature). In one example, the shape memory stored energy assembly 1010 includes an active heater coupled adjacent to the shape memory actuator 1000. For instance, a heating trigger within the projectile housing 1012 along the actuator body 1024. Heat is applied to the shape memory actuator 1000 by operation of the heating trigger to thereby actively trigger the transition of the shape memory actuator 1000 from the strained stored energy configuration 1008 shown in FIG. 10C to the fractured kinetic delivery configuration shown in FIG. 10D (described below).

Optionally, where the shape memory stored energy assembly 1010 is actively triggered, a thermal insulator is incorporated into the shape memory stored energy assembly 1010. Thermal insulators substantially isolate the shape memory actuator 1000 from ambient temperatures exterior to the shape memory stored energy assembly 1010. In one example, the thermal insulation is incorporated into the projectile housing 1012. In still another example, where the actuator body 1024 includes an actuator base 1029 engaged with the opposed end or second anchor 1034 of the projectile housing 1012 a thermal insulation cap is provided over top of the actuator base 1029 to ensure the shape memory actuator 1000 is not otherwise exposed to ambient temperatures exterior to the shape memory stored assembly 1010.

In another option, the shape memory stored energy assembly 1010 is without an active heat triggering system. Instead, the shape memory stored energy assembly 1010 is configured to operate according to ambient temperatures. For instance, where the ambient temperature around the shape memory stored energy assembly 1010 rises to or above the specified range of transition temperatures the shape memory actuator 1000 transitions from the strained stored energy configuration 1008 to the fractured kinetic fluid reconfiguration shown in FIG. 10D.

Figure 10D:
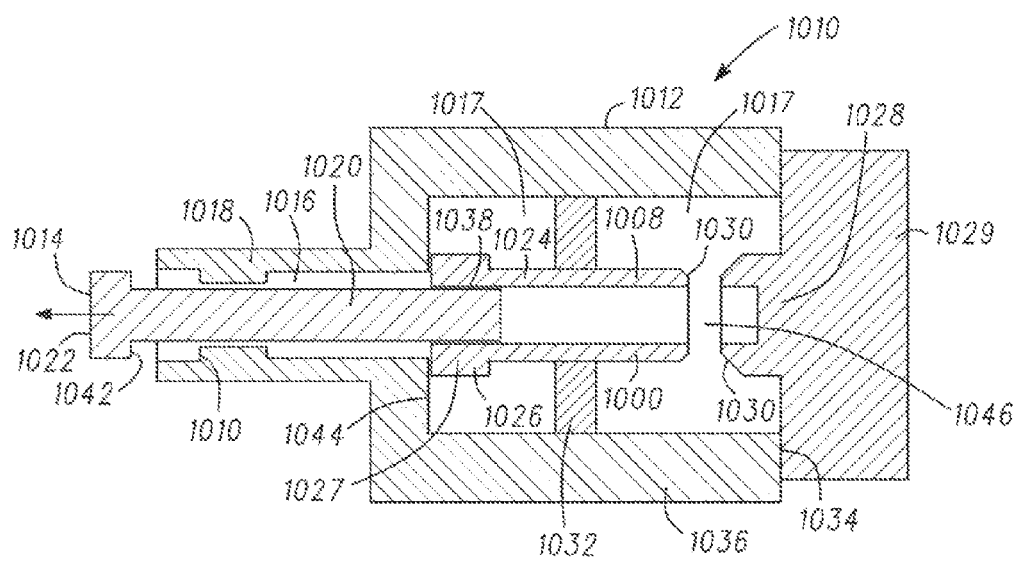
FIG. 10D illustrates the shape memory stored energy device of FIG. 10C in a fractured kinetic delivery configuration.

FIG. 10D shows the shape memory stored energy assembly 1010 in an actuated configuration with the shape memory actuator 1000 in a fractured kinetic delivery configuration 1046. The projectile 1014 is shown propelled with the projectile contact end 1022 projected away from the projectile barrel 1018. As previously described, the exposure of the shape memory actuator 1000 to a specified range of transition temperatures triggers the transition from the strained stored energy configuration 1008 to the fractured kinetic delivery configuration 1046 shown in FIG. 10D. Transition of the shape memory actuator 1000, for instance through one or more of active heat triggering or passive heat triggering (e.g., ambient temperature), causes tensioning in the actuator body 1024 and corresponding tight, static engagement of the first and second actuator ends 1026, 1028 with the corresponding first and second anchors 1032, 1034. Tension is developed in the shape memory actuator 1000 during transition and thereby generates potential energy within the shape memory actuator 1000 corresponding to the degree of pre-strain previously provided to the shape memory actuator 1000. Because the first and second actuator ends 1026, 1028 are anchored (e.g., with the first and second anchors 1032, 1034) the shape memory actuator 1000 is unable to transition into the unstrained configuration shown in FIG. 10A. Instead, the shape memory actuator 1000 fractures, for instance, at the fracture locus 1030. The fracture of the shape memory actuator 1000 immediately transitions the stored potential energy within the shape memory actuator 1000 corresponding to the tension and pre-strain of the shape memory actuator into kinetic energy that is delivered to the projectile 1014 thereby forcing the projectile 1014 to move in the direction shown in FIG. 10D. In one example, the projectile contact end 1022 is delivered through the projectile lumen 1016 and engages in violent contact with one or more fixed features configured to change their operation when engaged by the projectile 1014.

As previously described, by positioning the fracture locus 1030 remote from the projectile anchored end 1020 and the first actuator end 1026 the majority of the kinetic energy generated by the shape memory actuator 1000 is delivered to the projectile 1014. Stated another way, the majority of the shape memory actuator 1000 remains coupled to the projectile 1014 at fracture and the release of the tension in the large volume of the shape memory actuator 1000 connected with the projectile is correspondingly transmitted to the projectile 1014 in a proportional amount as kinetic energy.

Moreover, the shape memory actuator 1000 operates without an explosive. Accordingly, the operation of the shape memory actuator 1000 ensures that kinetic energy is only delivered along the projectile 1014 without the acoustic or explosive shock normally generated with explosive devices. Further, the shape memory stored energy device 1010 described herein is contained within a compact package similarly sized relative to a corresponding explosive device configured to actuate a feature (e.g., an explosive bolt and the like).

Furthermore, the shape memory actuator 1000 is positioned within the projectile housing 1012, for instance within the actuator cavity 1017. The shape memory actuator 1000 is thereby free from mechanical engagement with the projectile housing 1012 between the first and second anchors 1032, 1034. During transition of the actuator 1000 from the strained stored energy configuration to the fractured kinetic delivery configuration the actuator body 1024 is free of interference and thereby able to generate and transmit the maximum kinetic energy possible to the projectile 1014. Stated another way, because the shape memory actuator 1000 is free from interference during tensioning and subsequent fracture the actuator 1000 is free to move (whether tensing or propelling the projectile after fracture) within the actuator cavity 1017. The projectile 1014 is thereby propelled according to the unrestrained movement of the shape memory actuator 1000 after fracture.

As previously described herein, the shape memory actuator 1000 is tensioned and fractured when exposed to a specified transition temperature. The shape memory actuator 1000 fractures because both its first and second actuator ends 1026, 1028 are anchored, for instance, with the first and second anchors 1032, 1034. As shown in FIGS. 10C, D, the actuator body 1024 includes an actuator flange 1027 adjacent to the first actuator end 1026. The projectile housing 1012 includes a corresponding first anchor 1032, such as an annular flange extending around and engaged with the actuator flange 127. In another example, the projectile housing 1012 does not include the first anchor, such as an annular flange 1032. Instead, the shape memory stored energy assembly 1010 utilizes a barrel flange 1040 within the projectile barrel 1018 to engage with a corresponding contact flange 1042 on the projectile 1014. Tension is thereby developed within the shape memory actuator 1000 by the engagement of the contact flange 1042 with the barrel flange 1040 (e.g., another example of a first anchor) and engagement of the second anchor 1034 with the second actuator end 1028. The projectile fitting 1038 between the projectile 1014 and the shape memory actuator 1000 ensures that tension is developed within the shape memory actuator 1000 through anchoring of the projectile 1014 at the barrel flange 1040. In another example and as shown in FIG. 10C, the first anchor 1032 including an annular flange and the barrel flange 1040 cooperate with the contact flange 1042 and the actuator flange 1027 to form a composite first anchor configured to cooperate with the second anchor 1034 and the second actuator end 1028 to thereby develop tension within the shape memory actuator 1000 with an eventual fracturing of the actuator 1000 and propelling of the projectile 1014 through the projectile lumen 1016. Use of the both of the barrel flange and the actuator flange 1027 distributes forces throughout the projectile housing 1012 and minimizes failure of one of the anchoring features (e.g., 1040 or 1027)

In the fractured kinetic delivery configuration shown in FIG. 10D, the projectile 1014 as well as the shape memory actuator 1000 (in the fractured configuration) are fully retained by the projectile housing 1012. For instance, the projectile 1014 is retained at least partially within the projectile lumen 1016 and retained adjacent to the projectile housing 1012 according to an engagement of the retaining flange 1044 with the actuator flange 1027. The projectile 1014 while propelled from the projectile housing 1012 is also retained in an adjacent fashion to thereby substantially prevent the escape of the projectile 1014. Generation of debris, such as foreign object debris, through delivery of the projectile 1014 within an equipment assembly such as an engine, rocket and the like is thereby substantially eliminated. In a similar manner, the projectile housing 1012 contains the shape memory actuator in the strained configuration 1008 shown in FIG. 10C as well as the fractured kinetic delivery configuration 1046 shown in FIG. 10D. For instance, the shape memory actuator 1000 is retained within an actuator cavity 1017. As shown in FIG. 10D, upon fracturing of the shape memory actuator 1000 both components of the shape memory actuator 1000 remain contained within the actuator cavity 1017. The shape memory stored energy assembly 1010 is thereby able to propel a projectile 1014 when the shape memory actuator 1010 is exposed to its specified transition temperature and is able to do so without releasing the projectile 1014 or any fragments of the shape memory actuator 1000 outside of the projectile housing 1012. Stated another way, the shape memory stored energy assembly 1010 successfully captures all components of the assembly during operation and substantially prevents the fragmentation and generation of foreign object debris within the equipment assembly.

Optionally, the shape memory stored energy assembly 1010 is used in combination with a cover 502, as previously shown in FIGS. 5A, B, 7A, B. The shape memory stored energy assembly 1010 fastens the cover 502 with a housing assembly 504. When actuated, the shape memory stored energy assembly 1010 actuates the cover 502 into the open configuration shown in FIG. 7B. In this configuration, the projectile 1014 (for striking engagement as described herein) is optionally not included. In another example, the projectile 1014 is used as an intermediate between the shape memory actuator 1000 and the cover 502.

Figure 11:
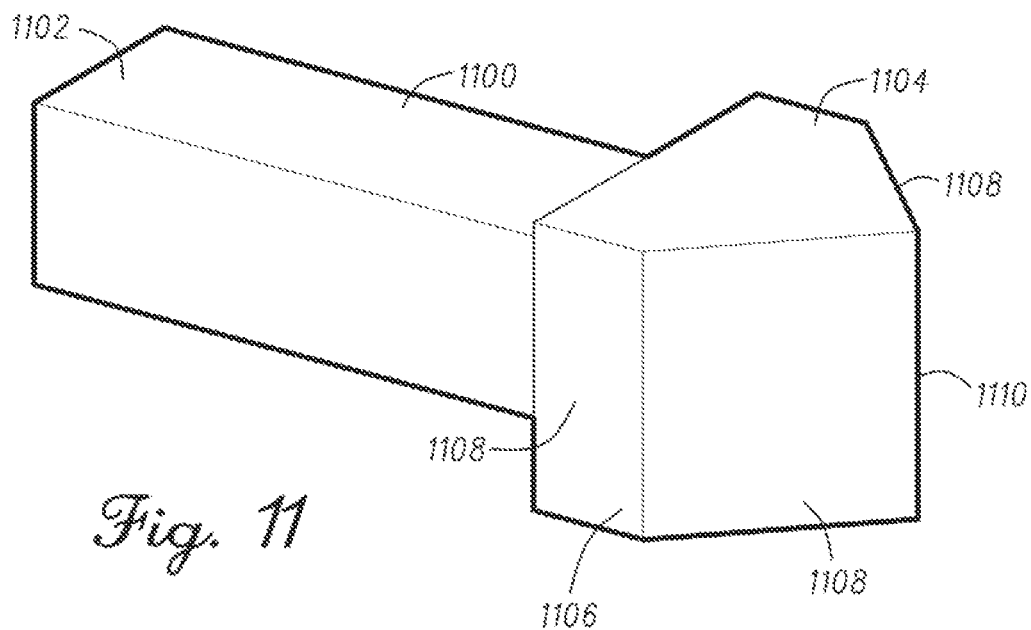
FIG. 11 illustrates one example of a projectile including a cutting face.

FIG. 11 shows another example of a projectile 1100 configured for severing one or more fixed features, such as a tube. The projectile 1100 includes a projectile anchored end 1102 and a projectile contact end 1104. As shown in FIG. 11, the projectile contact end 1104 includes a cutting face 1106. The cutting face 1106 includes one or more facets 1108 to correspondingly form a cutting edge 1110. As will be described in further detail below, in one example the projectile 1100 including the cutting edge 1110 is sized and shaped to engage with and sever an object. For instance, the cutting edge 1110 is sized and shaped to engage and cleave a tube to thereby interrupt fluid flow through the tube.

Figure 12A:
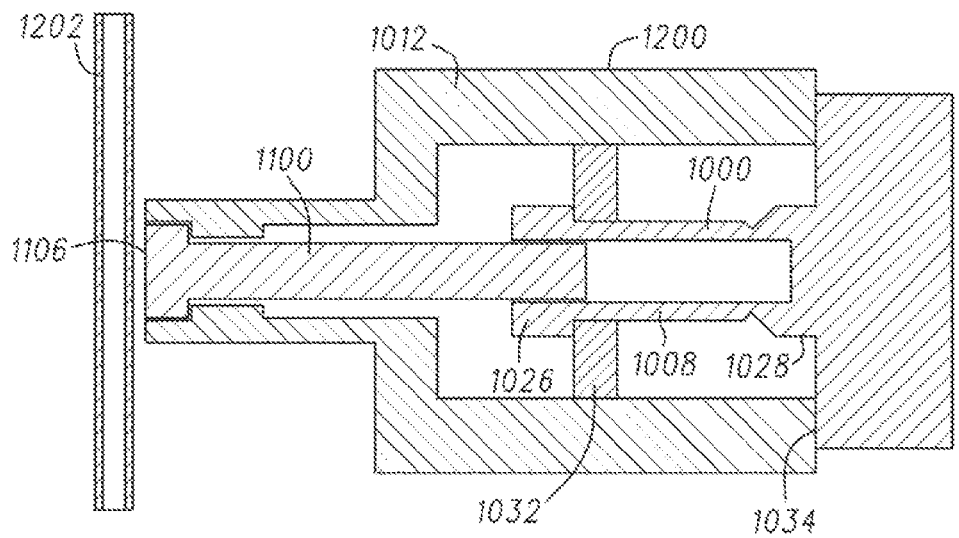
FIG. 12A illustrates one example of a shape memory stored energy device included with a tube assembly.
Figure 12B:
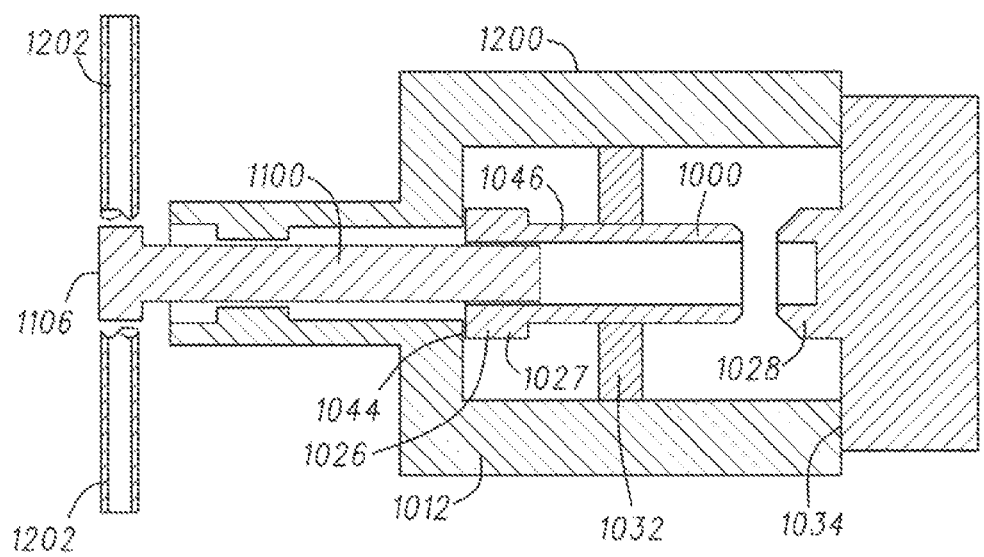
FIG. 12B illustrates the tube assembly of FIG. 12A with the shape memory actuator in the fractured kinetic delivery configuration.

FIGS. 12A and 12B show one example of a shape memory stored energy device 1200 configured for severing a tube 1202. In one example, the tube 1202 is configured to deliver cryogenic fluids, such as liquid nitrogen. The shape memory stored energy device 1200 includes a projectile 1100, such as the projectile 1100 shown in FIG. 11, retained within the projectile housing 1012. the projectile 1100 is coupled with a shape memory actuator 1000 anchored between first and second anchors 1032, 1034 within the projectile housing 1012. Referring to FIG. 12A, the projectile 1100 is shown in a first unactuated configuration with the shape memory actuator 1000 in a corresponding strained stored energy configuration where the first and second actuator ends 1026, 1028 are anchored between the projectile housing 1012, for instance, by the first anchor 1032 and the second anchor 1034. As previously described, anchoring of the first and second actuator ends 1026, 1028 substantially prevents the shape memory actuator 1000 from returning to the previous unstrained configuration (See FIG. 10A) when exposed to a specified transition temperature. Instead, when anchored as shown in FIG. 12A, exposure of the shape memory actuator 1000 causes the shape memory actuator 1000 to tension between the first and second anchors 1032, 1034.

Referring now to FIG. 12B, the shape memory stored energy device 1200 is shown in an actuated configuration where the shape memory actuator 1000 contained within the projectile housing 1012 has been exposed to a specified transition temperature thereby causing the shape memory actuator 1000 to transition from the strained stored energy configuration 1008 in FIG. 12A to a fractured kinetic delivery configuration as shown in FIG. 12B. As shown, the projectile 1100 has been propelled into engagement to sever the tube 1202. For instance, as previously discussed, the projectile 1100 includes a cutting face 1106. The cutting face 1106 engages with the tube 1202 and severs the tube 1202 to thereby prevent continued flow of, for instance cryogenic fluids, through the tube 1202. In one example, the shape memory actuator 1000 is configured to generate a specified amount of kinetic energy through shape memory material selection, pre-strain, volume of the shape memory material, fracture locus position and the like to ensure the projectile 1100 is delivered against the tube 1202 with sufficient force to cleave the tube.

As shown in FIG. 12B, the projectile 1100 is retained adjacent to the projectile housing 1112. For example, an actuator flange 1027 of the shape memory actuator 1000 is engaged with a corresponding retaining flange 1044 of the projectile housing 1012. Engagement of the flange 1044 substantially prevents the removal of the projectile 1100 from the projectile housing 1012. The projectile housing 1012 further retains the components of the shape actuator 1000 even after fracturing of the shape actuator 1000 by enveloping the fractured components of the actuator 1000. The shape memory stored energy device 1200 is thereby configured to propel the projectile 1100 as described herein while at the same time retaining each of the components of the shape memory stored energy device 1200 within or near the projectile housing 1012. Fragmentation and the generation of foreign object debris (FOD) is thereby substantially prevented. Additionally, the operation of the shape memory actuator 1000 ensures that kinetic energy is only delivered along the projectile 1100 without the acoustic or explosive shock normally generated with explosive devices. Further, the shape memory stored energy device 1200 described herein is contained within a compact package similarly sized relative to a corresponding explosive otherwise used to sever the tube at 1202.

Figure 13:
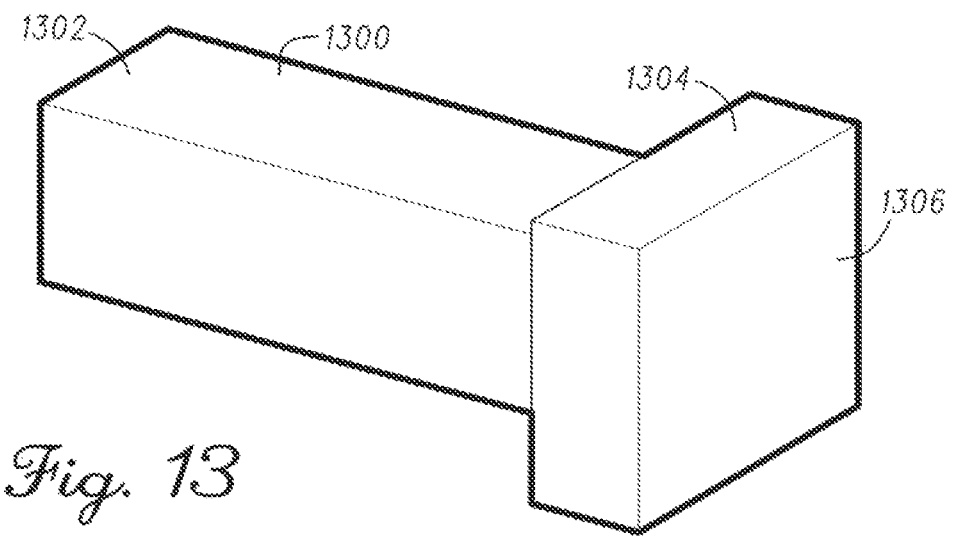
FIG. 13 illustrates one example of a projectile including a hammer face.

FIG. 13 shows another example of a projectile 1300 configured for use with a shape memory stored energy device such as any of the devices previously described herein. In the example shown in FIG. 13, the projectile 1300 includes a projectile anchored end 1302 and a projectile contact end 1304. As shown in FIG. 13, the projectile contact end 1304 includes a hammer face 1306 configured to provide violent surface to surface contact between the projectile 1300 and a fixed feature configured to change function, for instance, through detachment from another feature upon engagement by the projectile 1300. In one example, the projectile 1300 is constructed with, but not limited to, metals, composites and the like including titanium, steel, aluminum and other similar materials.

Figure 14A:
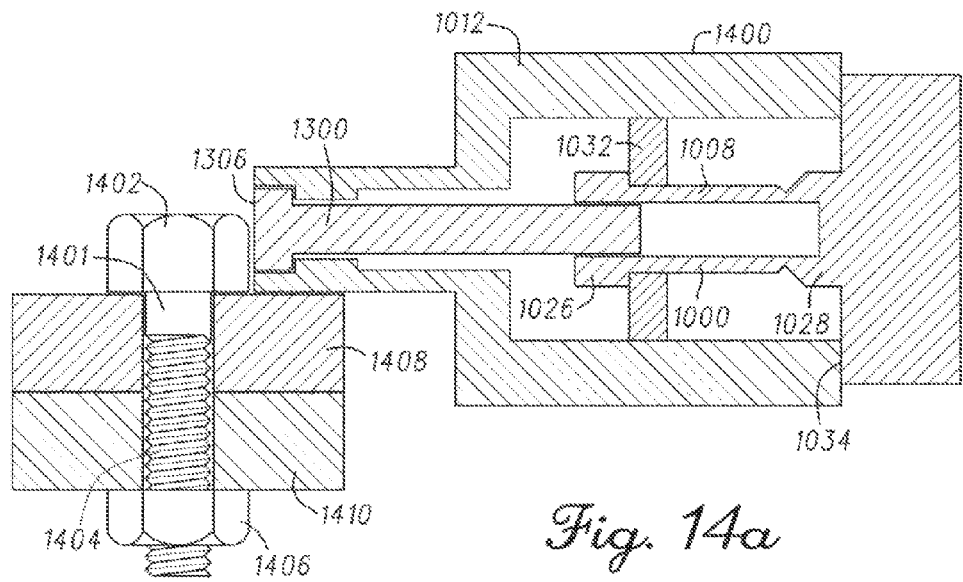
FIG. 14A illustrates one example of a shape memory stored energy device included with a fastener assembly.
Figure 14B:
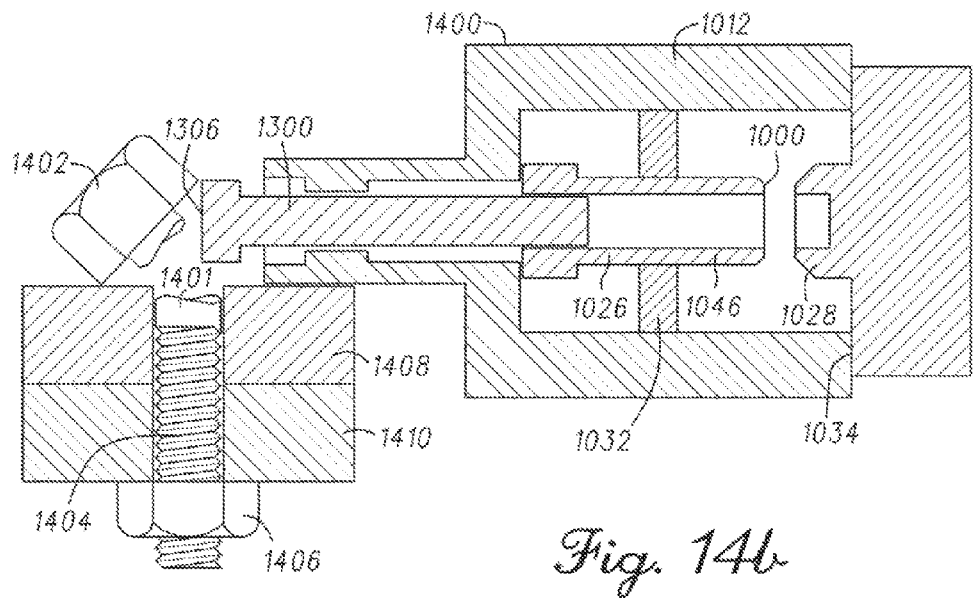
FIG. 14B illustrates the fastener assembly of FIG. 14A with the shape memory actuator in the fractured kinetic delivery configuration.

FIGS. 14A and 14B shown another example of a shape memory stored energy device 1400. The shape memory stored energy device 1400 is similar in at least some regards to previously described shape memory stored energy devices and assemblies. For instance, the shape memory stored energy device 1400 includes a projectile housing 1012 configured to retain the projectile 1300 as well as the shape memory actuator 1000 therein. Referring to FIG. 14A, the shape memory actuator 1000 is anchored between the first and second anchors 1032, 1034 forming part of the projectile housing 1012, and the first actuator end 1026 is coupled with the projectile 1300. The shape memory actuator 1000 is shown in a strained stored energy configuration 1008 in FIG. 14A. The projectile 1300 is further shown in an unactuated configuration with the hammer face 1306 positioned within or adjacent to a portion of the projectile housing 1012.

As further shown in FIG. 14A, the shape memory stored energy device 1400 is positioned adjacent to the fixed feature including a fastener 1401. As shown in FIG. 14A, the fastener 1401 is configured to couple two or more separate materials or work pieces 1408, 1410 to each other. For instance, the fastener 1401 retains two separate work pieces in close mechanical engagement with one another. As shown the fastener 1401 includes a fastener shaft 1404 and a fastener head 1402. In one example, the fastener 1401 is further held in place with a fixing device, such as a nut 1406.

Referring now to FIG. 14B, the shape memory stored energy device 1400 is shown in an actuated configuration. The projectile 1300 is propelled from the projectile housing 1012 and has made violent contact with the fastener head 1402. The violent contact with the fastener head 1402 shears the fastener head from the fastener shaft 1404 thereby freeing the first and second work pieces 1408, 1410 from their engagement otherwise created with the fastener 1401. As shown, the shape memory actuator 1000 is in a fractured kinetic delivery configuration 1046. In one example, the shape memory actuator 1000 is heated for instance with a heating trigger, such as an exothermic foil, coupled along the shape memory actuator 1000. Activation of the heating trigger including the exothermic foil causes the shape memory actuator 1000 to tension between the first and second anchors 1032, 1034. Because the first and second anchors 1032, 1034 hold the shape memory actuator 1000 statically the actuator fractures and the released tension of the shape memory actuator 1000 is immediately converted to kinetic energy that is delivered to the projectile 1300 to propel the projectile 1300 from the projectile housing 1012 and cause violent abrupt engagement with the fastener head 1402. In one example, the shape memory actuator 1000 is configured to generate a specified amount of kinetic energy through shape memory material selection, pre-strain, volume of the shape memory material, fracture locus position and the like to ensure the projectile 1300 is delivered against the fastener head 1402 with sufficient force to shear the fastener head 1402 from the fastener shaft 1404.

Figure 15:
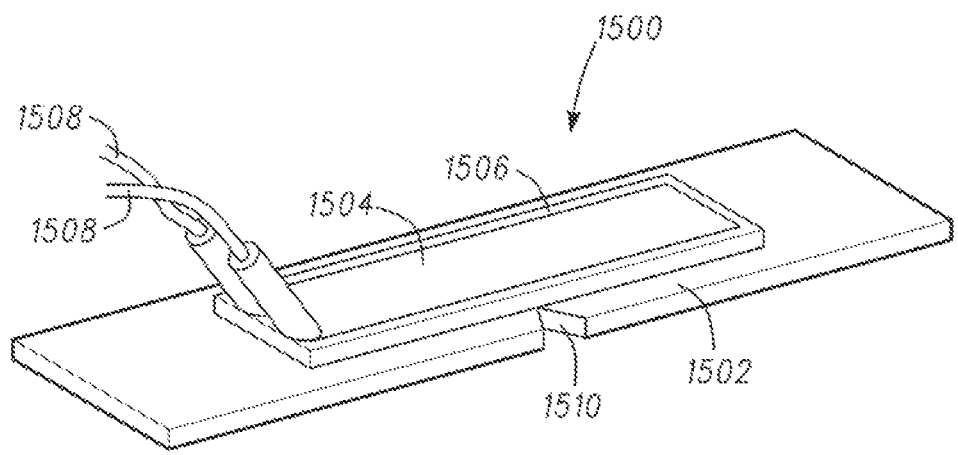
FIG. 15 illustrates one example of a heating trigger including an exothermic film coupled with the shape memory actuator of a shape memory stored energy assembly.

FIG. 15 shows one example of heating trigger 1500 configured to heat and raise the temperature of the shape memory actuator, such as the shape memory actuator 1502 shown in FIG. 15, to a specified transition temperature (or a range of transition temperatures). In the example shown in FIG. 15, the heating trigger 1500 includes an exothermic film 1504 coupled with the shape memory actuator 1502 with a heat conductive adhesive 1506. In one example, the exothermic film 1504 includes but is not limited to Nanofoil® a registered trademark of the Nanofoil Corporation of New York, N.Y. The exothermic film 1504 includes a reactive foil or laminate configured to generate exothermic heat and transmit that heat through the heat conductive adhesive 1504 to the shape memory actuator 1502 upon application of electricity, for instance, through the leads 1508. In one example, the exothermic film 1504 includes a laminate of differing materials that are catalyzed by the application of current through the leads 1508. Generation of heat at the exothermic film 1504 is transmitted to the shape memory actuator 1502 through the heat conductive adhesive 1506. In one example, the exothermic film 1504 is coupled with the shape memory actuator 1502 at a fracture locus 1510. Positioning the heating trigger 1500 including the exothermic film 1504 at the fracture locus 1510 ensures the shape memory actuator 1502 begins the transition from the strained stored energy configuration to the fractured kinetic delivery configuration 1046 (shown in FIG. 10D) adjacent to the fracture locus 1510. Fracture of the shape memory actuator 1502 is thereby predisposed to occur at the fracture locus 1510 and accordingly ensure reliable and predictable delivery of kinetic energy to the projectile 1014 of the shape memory stored energy assembly such as the assembly 1010 shown in FIGS. 10C and 10*d*.

Figure 16:
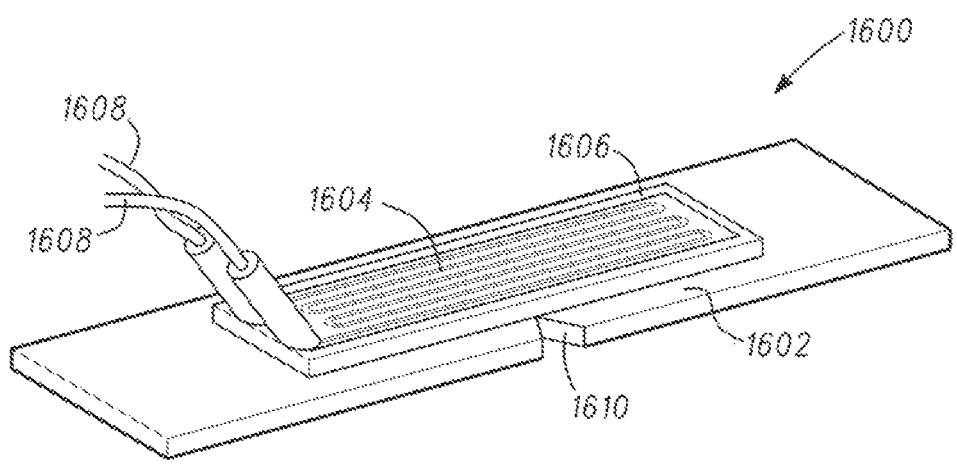
FIG. 16 illustrates another example of a heating trigger including a resistive substrate coupled with the shape memory actuator of a shape memory stored energy assembly.

FIG. 16 shows another example of a heating trigger 1600 including a resistive substrate 1604 coupled with a shape memory actuator 1602 through a heat conductive adhesive 1606. In one example, the resistive substrate 1604 includes a plurality of wire lines extending along the substrate. The wire lines are configured to resistively generate heat when current is applied, for instance, through the leads 1608 coupled with the resistive substrate 1604. In a similar manner to the heating trigger 1500, the heating trigger 1600 with the resistive substrate 1604 generates heat that is conducted through the heat conductive adhesives 1606 to a shape memory actuator 1602 to trigger transition of the shape memory actuator 1602 from the strained stored energy configuration (see FIG. 10C) to the fractured kinetic delivery configuration (see FIG. 10D). Stated another way, the resistive substrate 1604 is configured to generate sufficient heat to raise the temperature of the shape memory actuator 1602 to the specified transition temperature for the shape memory actuator 1602.

As with the heating trigger 1500, in one example, the resistive substrate 1604 is coupled along the shape memory actuator 1602, for instance near a fracture locus 1610. Positioning of the resistive substrate 1604 adjacent to the fracture locus 1610 ensures the transition of the shape memory actuator 1602 begins adjacent to the fracture locus 1610 and fracture of the shape memory actuator 1602 correspondingly occurs at the fracture locus 1610.

FIGS. 15 and 16 show two examples of heating triggers 1500, 1600. Other examples of heating triggers include, but are not limited to, direct resistance heating of the shape memory actuator, for instance, by applying current across the shape memory actuator 1000 shown in FIGS. 10C and 10D. In another example, the heating trigger includes a chemical substance applied to the shape memory actuator 1000, for instance thermite or a chemical substance that generates heat upon catalyzation. In one example, the heating trigger includes an igniter such as a magnesium igniter configured to begin a chemical reaction of the thermite and thereby generate heat along the shape memory actuator.

In still another example, the heating trigger includes one or more heating triggers positioned within the actuator cavity 1017 or the projectile housing 1012 shown in FIGS. 10C and 10D. Heating triggers installed within the actuator cavity 1017 or the projectile housing 1012 rely on one or more of conduction, convection or radiation to apply heat to raise the temperature of the shape memory actuator 1000 at or above the specified transition temperature or ranges of the same. In still another example, the shape memory stored energy assemblies described herein do not include heating triggers and are instead configured to operate according to ambient temperatures adjacent to the shape memory stored energy assemblies 1010. For instance, the projectile housing 1012 does not include a thermal insulator. The ambient temperature surrounding the shape memory stored energy assembly 1010 correspondingly heats the shape memory actuator 1000. The shape memory stored energy assembly 1010 thereby operates at elevated ambient temperatures corresponding to a specified transition temperature when the shape memory stored energy assembly is exposed to such temperatures within the surrounding environment. Optionally, the shape memory stored energy assemblies and devices described herein are configured to operate according to ambient temperatures that elevate the actuator temperature at or above the transition temperature and are also configured to operate when a heating trigger is initiated.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the invention may lie in less than all features of a single disclosed embodiment. Thus the following claims are hereby incorporated into the detailed description, with each claim standing on its own as a separate preferred embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

CONCLUSION

Devices, assemblies and methods are provided for propelling a projectile with a shape memory actuator. For instance, the shape memory actuator is coupled at an end of the actuator with a projectile. The shape memory actuator is anchored and transition of the actuator from a strained configuration causes it to fracture. The potential energy developed as the shape memory actuator tensions during transition is converted to kinetic energy upon fracture of the actuator. The kinetic energy is delivered to the projectile coupled with the shape memory actuator and propels the projectile accordingly. The velocity and corresponding kinetic energy of the projectile are readily tunable based on the specified mass of the projectile, the amount of strain initially imparted to the shape memory actuator, the volume of the actuator, the actuator material and the location of a fracture locus.

The devices, assemblies and methods described herein propel a projectile without using an explosive reaction. Instead, the shape memory actuator provides a controlled and directed application of kinetic energy along the projectile only. The safety risk involved with shape memory stored energy devices is thereby minimal relative to a corresponding explosive device. Further, the shape memory actuator does not generate explosive or acoustic shock that would otherwise harm sensitive electronics, machinery or optical assemblies. In a similar manner, because there is not an explosive, the shape memory actuator does not generate or transmit heat to sensitive components.

Additionally, the shape memory actuator does not fragment as is the case with an explosive device. FOD and the like are thereby not generated. The shape memory stored energy devices and assemblies described herein retain the projectile and the shape memory actuator (in strained and fractured configurations) adjacent to the projectile housing to ensure there is no FOD. Sensitive electronic and mechanical components may thereby be positioned in close proximity to the shape memory stored energy devices and assemblies with substantially no risk to the components with fracture of the shape memory actuator. Stated another way, the shape memory stored energy devices and assemblies described herein capture all of their moving parts including the actuator when fractured, the projectile and the like and substantially prevent the scattering of the parts within a larger equipment assembly (e.g., and engine, optical assembly, rocket and the like).

What is claimed is:

1. A shape memory stored energy assembly comprising:
 a projectile housing having a projectile lumen extending through a portion of the projectile housing, the projectile housing includes first and second anchors and an interposing brace;
 a projectile within the projectile lumen, the projectile is movable relative to the projectile housing, the projectile includes:
  a projectile anchored end, and
  a projectile contact end; and
 a shape memory actuator coupled between the projectile anchored end and the projectile housing, the shape memory actuator is configured to transition from a strained energy stored configuration to a fractured kinetic delivery configuration at a specified temperature range to propel the projectile through the projectile lumen, wherein first and second opposed shape memory actuator ends of the shape memory actuator are coupled between the first and second anchors, respectively.

2. The shape memory stored energy assembly of claim 1, wherein the shape memory actuator includes an actuator body extending between the projectile housing and the projectile anchored end, and the shape memory actuator includes a fracture locus near the projectile housing and remote from the projectile anchored end.

3. The shape memory stored energy assembly of claim 2, wherein the fracture locus includes at least one notch in the shape memory actuator.

4. The shape memory stored energy assembly of claim 1, wherein the projectile housing includes an actuator cavity and the shape memory actuator is within the actuator cavity and spaced from walls of the actuator cavity.

5. The shape memory stored energy assembly of claim 1, wherein the shape memory actuator includes an actuator flange at the first shape memory actuator end and the actuator flange is engaged with the first anchor, and the second shape memory actuator end is engaged with the second anchor.

6. The shape memory stored energy assembly of claim 1, wherein the projectile housing includes a barrel containing at least a portion of the projectile therein.

7. The shape memory stored energy assembly of claim 6, wherein the projectile contact end includes a contact flange, and the contact flange is engaged with a barrel flange in the barrel while the shape memory actuator is in the strained energy stored configuration.

8. The shape memory stored energy assembly of claim 1 comprising a heating trigger coupled with the shape memory actuator.

9. The shape memory stored energy assembly of claim 8, wherein the heating trigger includes an exothermic film on a portion of the shape memory actuator.

10. The shape memory stored energy assembly of claim 9, wherein the exothermic film is coupled with an electric current source.

11. The shape memory stored energy assembly of claim 8, wherein the heating trigger consists of one or more of a resistive substrate, a current source coupled with the shape memory actuator and an exothermic chemical trigger coupled with the heating trigger.

12. An equipment assembly comprising:
an equipment housing;
a fixed feature configured to alter its function when engaged;
a projectile housing having a projectile lumen extending through a portion of the projectile housing;
a projectile within the projectile lumen, the projectile is movable relative to the projectile housing, the projectile includes:
a projectile anchored end, and
a projectile contact end; and
a shape memory actuator coupled between the projectile anchored end and the projectile housing, wherein the shape memory actuator includes a fracture locus near the projectile housing and remote from the projectile anchored end, and the shape memory actuator is configured to transition from a strained energy stored configuration to a fractured kinetic delivery configuration at a specified temperature range, the shape memory actuator in the fractured kinetic delivery configuration moves the projectile through the projectile lumen and engages the projectile contact end with the fixed feature.

13. The equipment assembly of claim 12, wherein the projectile housing contains the entire shape memory actuator in the strained energy stored configuration and the fractured kinetic delivery configuration.

14. The equipment assembly of claim 12, wherein the projectile housing envelops the entire shape memory actuator in the strained energy stored configuration and the fractured kinetic delivery configuration.

15. The equipment assembly of claim 12, wherein the shape memory actuator includes an actuator flange and the projectile housing includes a retaining flange, and the retaining flange engages with the actuator flange in the fractured kinetic delivery configuration and retains the projectile adjacent to the projectile housing.

16. The equipment assembly of claim 12, wherein the fixed feature includes a fluid delivery tube, and the projectile contact end is configured to sever the fluid delivery tube.

17. The equipment assembly of claim 12, wherein the fixed feature includes a fastener head coupled with a fastener shaft, and the projectile contact end is configured to fracture the fastener head from the fastener shaft.

18. The equipment assembly of claim 12, wherein the projectile contact end includes a cutting face.

19. The equipment assembly of claim 12, wherein the projectile contact end includes a hammer face.

20. A shape memory stored energy assembly comprising:
a projectile housing having a projectile lumen extending through a portion of the projectile housing, the projectile housing includes a barrel;
a projectile within the projectile lumen, at least a portion of the projectile is within the barrel, the projectile is movable relative to the projectile housing, the projectile includes:
a projectile anchored end, and
a projectile contact end;
a shape memory actuator coupled between the projectile anchored end and the projectile housing, the shape memory actuator is configured to transition from a strained energy stored configuration to a fractured kinetic delivery configuration at a specified temperature range to propel the projectile through the projectile lumen; and wherein the shape memory actuator includes an actuator body extending between the projectile housing and the projectile anchored end, and the shape memory actuator includes a fracture locus near the projectile housing and remote from the projectile anchored end.

21. The shape memory stored energy assembly of claim 20, wherein the fracture locus includes at least one notch in the shape memory actuator.

22. The shape memory stored energy assembly of claim 20, wherein the projectile housing includes an actuator cavity and the shape memory actuator is within the actuator cavity and spaced from walls of the actuator cavity.

23. The shape memory stored energy assembly of claim 20, wherein the projectile housing includes first and second anchors and an interposing brace and first and second opposed shape memory actuator ends are coupled between the first and second anchors, respectively.

24. The shape memory stored energy assembly of claim 23, wherein the shape memory actuator includes an actuator flange at the first shape memory actuator end and the actuator flange is engaged with the first anchor, and the second shape memory actuator end is engaged with the second anchor.

25. The shape memory stored energy assembly of claim 20 comprising a heating trigger coupled with the shape memory actuator.

26. The shape memory stored energy assembly of claim 25, wherein the heating trigger includes an exothermic film on a portion of the shape memory actuator.

27. A shape memory stored energy assembly comprising:
a projectile housing having a projectile lumen extending through a portion of the projectile housing, the projectile housing includes first and second anchors and an interposing brace;
a projectile within the projectile lumen, the projectile is movable relative to the projectile housing, the projectile includes:
a projectile anchored end, and
a projectile contact end;
a shape memory actuator coupled between the projectile anchored end and the projectile housing, wherein the shape memory actuator includes a fracture locus, and the shape memory actuator is configured to transition from a strained energy stored configuration to a fractured kinetic delivery configuration at a specified temperature range to propel the projectile through the projectile lumen, wherein first and second opposed shape memory actuator ends of the shape memory actuator are coupled between the first and second anchors, respectively; and
wherein the projectile housing includes an actuator cavity and the shape memory actuator is within the actuator cavity and spaced from walls of the actuator cavity.

28. The shape memory stored energy assembly of claim 27, wherein the shape memory actuator includes an actuator body extending between the projectile housing and the projectile anchored end, and the shape memory actuator includes a fracture locus near the projectile housing and remote from the projectile anchored end.

29. The shape memory stored energy assembly of claim 28, wherein the fracture locus includes at least one notch in the shape memory actuator.

30. The shape memory stored energy assembly of claim 27, wherein the shape memory actuator includes an actuator flange at the first shape memory actuator end and the actuator flange is engaged with the first anchor, and the second shape memory actuator end is engaged with the second anchor.

31. The shape memory stored energy assembly of claim 28, wherein the projectile housing includes a barrel containing at least a portion of the projectile therein.

32. The shape memory stored energy assembly of claim 31, wherein the projectile contact end includes a contact flange, and the contact flange is engaged with a barrel flange in the barrel while the shape memory actuator is in the strained energy stored configuration.

* * * * *

UNITED STATES PATENT AND TRADEMARK OFFICE
CERTIFICATE OF CORRECTION

PATENT NO.         : 8,789,366 B2
APPLICATION NO.    : 13/155575
DATED              : July 29, 2014
INVENTOR(S)        : Lyman et al.

It is certified that error appears in the above-identified patent and that said Letters Patent is hereby corrected as shown below:

On The Title Page, Item (56)

On page 2, in column 2, under "Other Publications", line 3, delete "mUltipoint" and insert --multipoint--, therefor In The Specification In column 6, line 22, delete "506" and insert --502--, therefor In column 9, line 12, after "projectile", insert --housing--, therefor In column 9, line 54, delete "tsubsequent" and insert --subsequent--, therefor In column 9, line 66, delete "130" and insert --1030--, therefor In column 10, line 67, before "assembly", insert --energy--, therefor In column 11, line 61, delete "device" and insert --assembly--, therefor In column 12, line 25, delete "127" and insert --1027--, therefor In column 13, line 8, delete "1010" and insert --1000--, therefor In column 14, line 17, delete "1112" and insert --1012--, therefor In column 15, line 54, delete "1504" and insert --1506--, therefor Signed and Sealed this
Fifth Day of July, 2016

Michelle K. Lee
*Director of the United States Patent and Trademark Office*